US010814900B2

(12) United States Patent
Baña Castro et al.

(10) Patent No.: US 10,814,900 B2
(45) Date of Patent: Oct. 27, 2020

(54) STEERING WHEEL FOR A MOTOR VEHICLE

(71) Applicant: DALPHI METAL ESPANA S.A., Vigo (ES)

(72) Inventors: Ramon Baña Castro, Vigo (ES); Pedro Pereiro Coto, O Porrino (ES); Marcelino Moure Fernández, Nigrán (ES)

(73) Assignee: Dalphi Metal Espana, S.A., Vigo (ES)

( * ) Notice: Subject to any disclaimer, the term of this patent is extended or adjusted under 35 U.S.C. 154(b) by 0 days.

(21) Appl. No.: 16/462,798

(22) PCT Filed: Oct. 20, 2017

(86) PCT No.: PCT/EP2017/076809
§ 371 (c)(1),
(2) Date: May 21, 2019

(87) PCT Pub. No.: WO2018/099651
PCT Pub. Date: Jun. 7, 2018

(65) Prior Publication Data
US 2019/0367070 A1    Dec. 5, 2019

(30) Foreign Application Priority Data

Nov. 30, 2016  (DE) .................. 10 2016 123 134
Nov. 30, 2016  (DE) .................. 10 2016 123 177

(51) Int. Cl.
*B62D 1/06*        (2006.01)
*B62D 1/08*        (2006.01)
(Continued)

(52) U.S. Cl.
CPC .............. *B62D 1/08* (2013.01); *B29C 44/351* (2013.01); *B29C 45/14418* (2013.01);
(Continued)

(58) Field of Classification Search
CPC . B62D 1/04; B62D 1/046; B62D 1/06; B62D 1/065; B62D 1/08; B62D 1/10; B29C 44/351; B29C 45/14418
See application file for complete search history.

(56) References Cited

U.S. PATENT DOCUMENTS 4,598,002 A *  7/1986  Kimura .................... B62D 1/04
                                                            428/35.8
6,575,054 B2 * 6/2003  Sugiyama ................ B62D 1/04
                                                              74/552

(Continued)

FOREIGN PATENT DOCUMENTS

DE    102015006543 A1   12/2015
JP      56154025 A *    11/1981  ....... B29C 45/14418
(Continued)

*Primary Examiner* — Luis A Gonzalez
(74) *Attorney, Agent, or Firm* — Gigette M. Bejin

(57) ABSTRACT

The present disclosure relates to a foamed steering wheel for an automotive vehicle and is intended for an especially advantageous manufacturing process of said steering wheel. For this purpose, it is suggested that in the area of the foamed edge the foam wrapping is adjacent to a skeleton projection of the steering wheel skeleton and to a cover projection of the skeleton cover, wherein the skeleton projection and the cover projection are directly adjacent to each other and together form a substantially circumferentially closed wall projection for contacting a foaming mold.

8 Claims, 3 Drawing Sheets

(51) Int. Cl.
*B62D 1/04* (2006.01)
*B62D 1/10* (2006.01)
*B29C 44/34* (2006.01)
*B29C 45/14* (2006.01)

(52) U.S. Cl.
CPC .............. *B62D 1/04* (2013.01); *B62D 1/06* (2013.01); *B62D 1/10* (2013.01)

(56) References Cited

U.S. PATENT DOCUMENTS

| | | | |
|---|---|---|---|
| 7,685,905 B2 * | 3/2010 | Miltenberger | ........... B62D 1/04 74/552 |
| 9,623,639 B2 * | 4/2017 | Kong | ........ B32B 3/30 |

FOREIGN PATENT DOCUMENTS

| | | | | |
|---|---|---|---|---|
| JP | 57158158 A | * | 9/1982 | ............... B62D 1/04 |
| JP | 60060065 A | * | 4/1985 | ............... B62D 1/04 |
| JP | 61089819 A | * | 5/1986 | ....... B29C 45/14418 |
| JP | 2013256236 A | * | 12/2013 | ............... B62D 1/04 |
| WO | 2005023591 A2 | | 3/2005 | |
| WO | 2016014692 A1 | | 1/2016 | |
| WO | 2016172709 A1 | | 10/2016 | |

\* cited by examiner

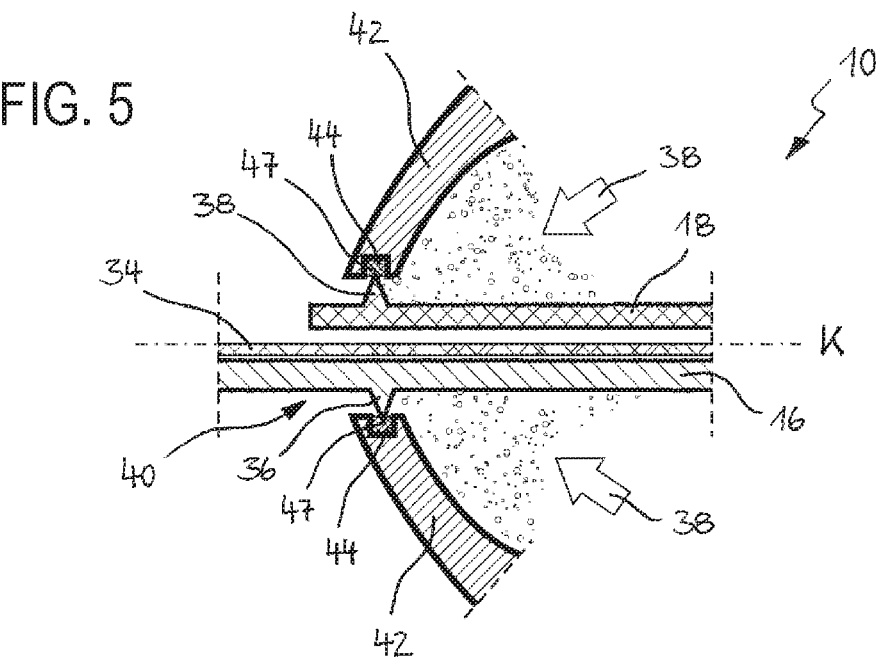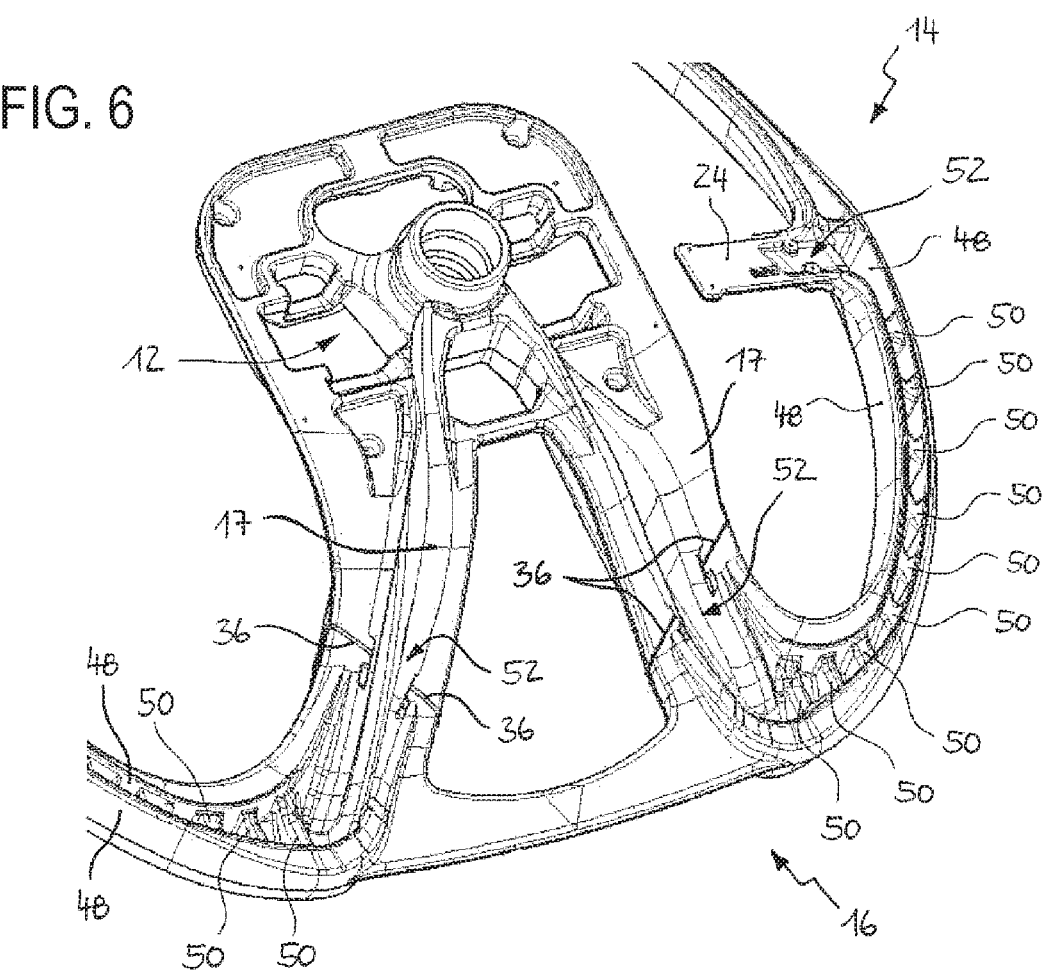

STEERING WHEEL FOR A MOTOR VEHICLE

CROSS-REFERENCE TO RELATED APPLICATIONS

This application is a national stage of International Application No. PCT/EP2017/076809, filed 20 Oct. 2017, the disclosure of which is incorporated herein by reference in its entirety, and which claimed priority to German Patent Application No. 10 2016 123 177.0, filed 30 Nov. 2016 and German Patent Application No. 10 2016 123 134.7, filed 30 Nov. 2016, the disclosures of which are incorporated herein by reference in its entirety.

TECHNICAL FIELD

The present disclosure relates to a steering wheel for an automotive vehicle.

BACKGROUND

Vehicle steering wheels generally comprise a hub and a steering wheel rim connected to the hub by a spoke. There are known numerous steering wheel shapes which differ e.g. by the type and the number of spokes between the hub and the steering wheel rim.

For convenient setting of specific vehicle gadgets such as telephone system, radio, car computer or the like, prior art documents already describe steering wheels which include appropriate switching elements or other operating units in the area of the spokes, for example.

Up-to-date vehicle steering wheels usually comprise, apart from said operating units, also steering wheel lining parts as well as a steering wheel skeleton which is partially foam-wrapped with a plastic material, with the steering wheel skeleton extending out of the foam-wrapping in the area of the operating units and/or the steering wheel lining parts, for example. When foam-wrapping skeletons, a reliable sealing process between a foaming mold and the steering wheel skeleton is complicated and expensive at such foamed edges. The sealing is especially difficult when lines such as for data transfer and/or power supply of an operating unit extend in the area of the foamed edge.

Therefore, it is the object of the invention to provide a steering wheel in which a foam-wrapped steering wheel skeleton extends out of the foam wrapping, with the steering wheel design allowing especially simple manufacturing process.

SUMMARY

In accordance with the present disclosure, this object is achieved by a steering wheel for an automotive vehicle, comprising a steering wheel axis, a hub for mounting the steering wheel to a steering shaft rotatable about the steering wheel axis as well as a steering wheel rim which has a steering wheel skeleton and a skeleton cover, is connected to the hub by a spoke and at least partially surrounds the hub in the circumferential direction, wherein the steering wheel skeleton and the skeleton cover are partially enclosed by a foam wrapping and protrude from the foam wrapping at a foamed edge, wherein the foam wrapping is adjacent to a skeleton projection of the steering wheel skeleton and to a cover projection of the skeleton cover in the area of the foamed edge, wherein the skeleton projection and the cover projection are directly adjacent to each other and together form a substantially circumferentially closed wall projection being for contacting a foaming mold. The skeleton cover in this case covers areas of the steering wheel skeleton which are difficult to seal, especially are concavely shaped, and the circumferential wall projection formed by the steering wheel skeleton and the skeleton cover ensures simple reliable and tight contact with the foaming mold, which in total enables easy foam-wrapping with little effort.

Of preference, the steering wheel skeleton and the skeleton cover in the area of the foam wrapping form at least in portions passage walls of a line passage which is largely foam-free in the interior, wherein the skeleton projection and the cover projection are disposed on an outside of the passage walls, enclose the line passage and extend transversely, especially substantially perpendicularly to a passage axis of the line passage. A free edge of the skeleton projection and, resp., cover projection facing away from the steering wheel skeleton and the skeleton cover is especially sharp-edged so that, when the foaming mold is closed, the edge engages in a seal of the foaming mold and ensures especially reliable sealing. Of preference, the free edge includes no radial steps with respect to the passage axis but extends continuously, especially even linearly in portions, in the circumferential direction. This contributes in turn to especially reliable sealing between the wall projection and the foaming mold while the geometry of the foaming mold is especially simple.

In one embodiment of the steering wheel, at the steering wheel rim a mounting arm for fastening an operating unit is configured, the mounting arm extending from the steering wheel rim to a free end and the wall projection enclosing the mounting arm between the steering wheel rim and the free end. Relating to a tangential direction in its starting point at the steering wheel rim, the mounting arm preferably extends at an angle of at least 30° and a maximum of 90° with respect to the tangential direction, especially preferred in the radial direction, i.e. at an angle of 90° with respect to the tangential direction. The mounting arm may move inwardly or outwardly, i.e. in the direction to the hub or away from the hub. The operating unit especially is a (multi-functional) switch assembly for the steering wheel which includes a coupling member as well as a positioning portion and can be attached to the mounting arm of the steering wheel and can be positively coupled to the mounting arm. Preferably, the operating unit can be attached from the free end of the mounting arm in the direction of the steering wheel rim. The coupling member of the operating unit is preferably configured as a stop element, especially as an elastic stop spring.

In this embodiment of the steering wheel, in the area of the mounting arm a foamed edge may be provided, wherein the free end of the mounting arm protrudes from the foam wrapping.

Further, the skeleton cover may have an integrally formed cover extension which forms at least part of the mounting arm, the cover projection being formed integrally at the cover extension. At a free end of the cover extension especially a plug connector is configured in which a line for data transfer and/or power supply of the operating unit ends. Said plug connector is preferably complementary to a plug connector of the operating unit.

According to another embodiment of the steering wheel, the wall projection encloses the spoke between the hub and the steering wheel rim.

Furthermore, in the area of the spoke a foamed edge may be provided, with the spoke protruding from the foam wrapping on the hub side.

The steering wheel skeleton of the steering wheel is preferably made from metal or metal alloy, whereas the skeleton cover is preferably a plastic cover. The sealing against the foaming mold in this case is thus realized by the interaction of a metal component and a plastic component which jointly form the circumferential wall projection.

BRIEF DESCRIPTION OF THE DRAWINGS

Further features and advantages of the invention will be resulting from the following description of a preferred embodiment with reference to the drawings, wherein:

FIG. 5 shows a schematic section detail V-V of the steering wheel according to FIG. 4; and FIG. 6 shows a cutout of a perspective rear view of a steering wheel skeleton of the steering wheel according to FIG. 2.

Like reference numerals refer to like parts throughout the description of several views of the drawings.

DETAILED DESCRIPTION

Figure 1:
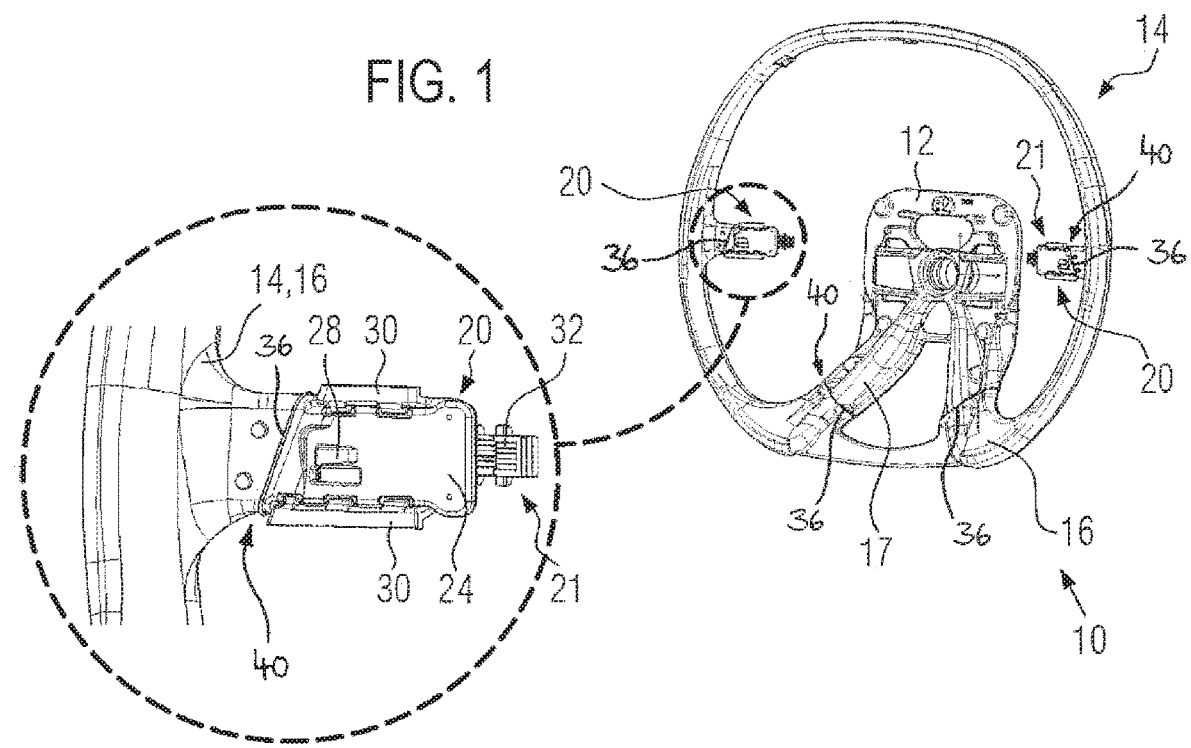
FIG. 1 shows a top view onto a steering wheel according to the invention.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any manner.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause: other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

Figure 2:
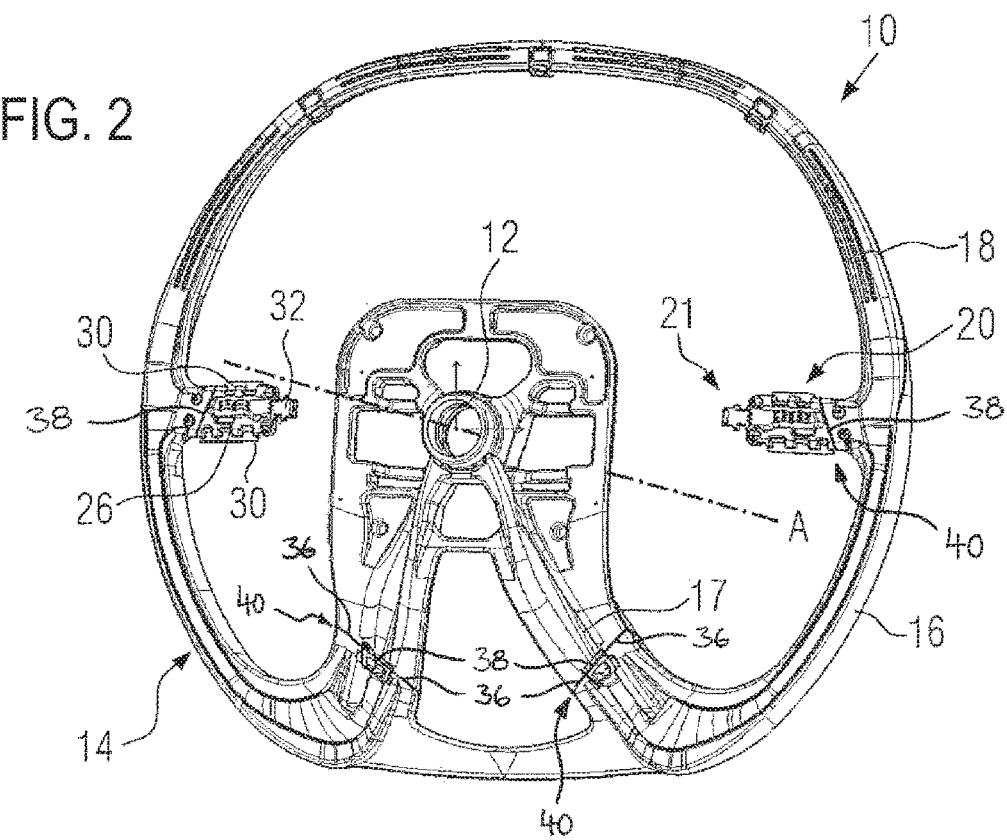
FIG. 2 shows a rear view of the steering wheel from FIG. 1.

FIGS. 1 and 2 illustrate views of a steering wheel 10 for an automotive vehicle, comprising a steering wheel axis A, a hub 12 for mounting the steering wheel 10 to a steering shaft rotatable about the steering wheel axis A as well as a steering wheel rim 14 which is connected to the hub 12 by a spoke 17 and at least partially surrounds the hub 12 in the circumferential direction.

Further, a steering wheel skeleton 16 is provided as a load-bearing component part of the steering wheel 10, with the hub 12, the steering wheel rim 14 as well as one or more spokes 17 of the steering wheel 10 comprising portions of the steering wheel skeleton 16. According to FIG. 1, the steering wheel skeleton 16 is a one-piece metal part, for example an injection-molded part made from magnesium alloy or aluminum alloy, but it may alternatively be composed of plural skeleton components as well.

By way of FIG. 2, it becomes evident that the steering wheel 10, especially the steering wheel rim 14, includes a skeleton cover 18 mounted to the steering wheel skeleton 16 on a rear side of the steering wheel skeleton 16. In this context, the rear side is referred to be the side which, in the mounted state of the steering wheel 10, faces an instrument panel of the vehicle. The skeleton cover 18 especially is a plastic part which forms a line passage 19 together with the steering wheel skeleton 16, for example, for guiding electric lines 34.

At the steering wheel rim 14 two mounting arms 20 are configured for fastening an operating unit 22 (see FIG. 4), wherein each of the mounting arms 20 extends starting from the steering wheel rim 14 toward a free end 21. In particular, the mounting arms 20 extend in a plane or in parallel to a plane spanned by the steering wheel rim 14 and extending substantially perpendicularly to the steering wheel axis A. In the present example embodiment, the mounting arms 20 protrude inwardly from the steering wheel rim 14, i.e. in the direction of the hub 12. As a matter of course, also configuration variants are imaginable in which the mounting arms 20 project outwardly, i.e. away from the hub 12, or extend obliquely with respect to the plane spanned by the steering wheel rim 14.

According to FIGS. 1 and 2, each mounting arm 20 is formed by a skeleton extension 24 formed integrally at the steering wheel skeleton 16 as well as a cover extension 26 formed integrally at the skeleton cover 18. Especially by way of the detail cutout from FIG. 1 it becomes evident that the mounting arm 20 includes a coupling member 28 for detachable fastening of the operating unit 22 and a positioning portion 30 for fixing the operating unit 22 in position. The coupling member 28 in the present case is a stop element for locking the operating unit 22 on the steering wheel rim 14, wherein it would be a possible alternative that the coupling member 28 is a screw thread or a screw for fastening the operating unit 22 to the steering wheel rim 14. The coupling member 28 in any case ensures safe and robust connection and prevents the operating unit 22 from inadvertently detaching from the steering wheel rim 14. The positioning portion 30, on the other hand, serves for exactly aligning the operating unit 22 and primarily transversely to an assembling and disassembling direction contributes to a bearing of the operating unit 22 which is largely free from play. Accordingly, the positioning portion 30 especially is a guiding portion which forms a mounting guide together with a guiding portion of the operating unit 22.

In the illustrated configuration example, the coupling member 28 is integrally formed at the skeleton extension 24 of the steering wheel skeleton 16 as a rigid snap lug, whereas the positioning portion 30 is formed integrally at the cover extension 26 of the skeleton cover 18 in the form of two parallel guide rails. Apart from the coupling member 28 and the positioning portion 30, the mounting arm 20 at its free end 21 has a plug connector 32 in which an electric line 34 for data transfer and/or power supply of the operating unit 22 ends. Thus, said plug connector 32 is designed to be complementary to a plug connector of the operating unit 22.

Further, the steering wheel skeleton 16 has an elongate skeleton projection 36 and the skeleton cover 18 has an associated elongate cover projection 38. The skeleton projection 36 and the cover projection 38 are directly adjacent to each other and jointly form a substantially circumferentially closed wall projection 40 for contacting a foaming mold 42 (see FIG. 5).

The steering wheel 10 preferably comprises plural separate wall projections 40, wherein, in the present example embodiment, a total of four wall projections 40 are present. Each of the skeleton projections 36 is integrally formed with the steering wheel skeleton 16, while each of the cover projections 38 is formed integrally with the skeleton cover 18. By way of the FIGS. 1 and 2 it becomes clear that a wall projection 40 is provided at each mounting arm 20 of the steering wheel 10, the elongate wall projection 40 enclosing the mounting arm 20 between the steering wheel rim 14 and the free end 21 of the mounting arm 20.

Further, according to FIGS. 1 and 2, at each spoke 17 of the steering wheel 10 also a wall projection 40 is provided, with the wall projection 40 enclosing the spoke 17 between the hub 12 and the steering wheel rim 14. According to FIG. 5, said substantially circumferentially closed wall projections 40 each composed of a skeleton projection 36 and a cover projection 38 are adjacent to the foaming mold 42 during foam-wrapping of the steering wheel skeleton 16 and the skeleton cover 16 and form a seal for the foam material.

Figure 3:
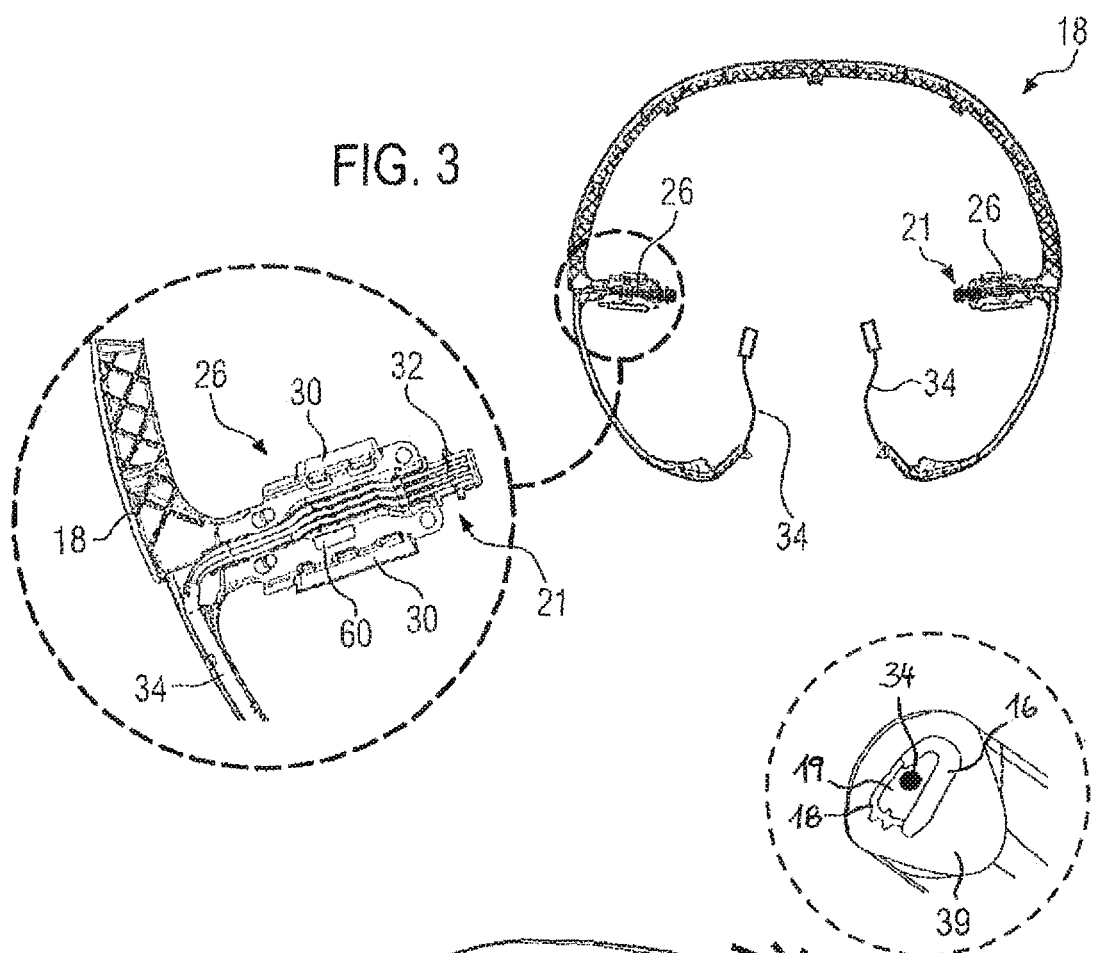
FIG. 3 shows a separate view of a skeleton cover of the steering wheel according to FIGS. 1 and 2.

FIG. 3 illustrates a top view onto a side of the skeleton cover 18 facing the steering wheel skeleton 16. Together with the section detail of the steering wheel rim 17 shown in FIG. 4, it becomes evident that the steering wheel 10 includes an electric line 34 for data transfer and/or power supply of the operating unit 22, the skeleton cover 18 forming in its state mounted on the steering wheel skeleton 16 together with the steering wheel skeleton 16 a protected line passage 19 within which the line 34 is extending. In this case, the plug connector 32 is concretely formed integrally at a free end of the cover extension 26 in which the electric line 34 for data transfer and/or power supply of the operating unit 22 ends.

Figure 4:
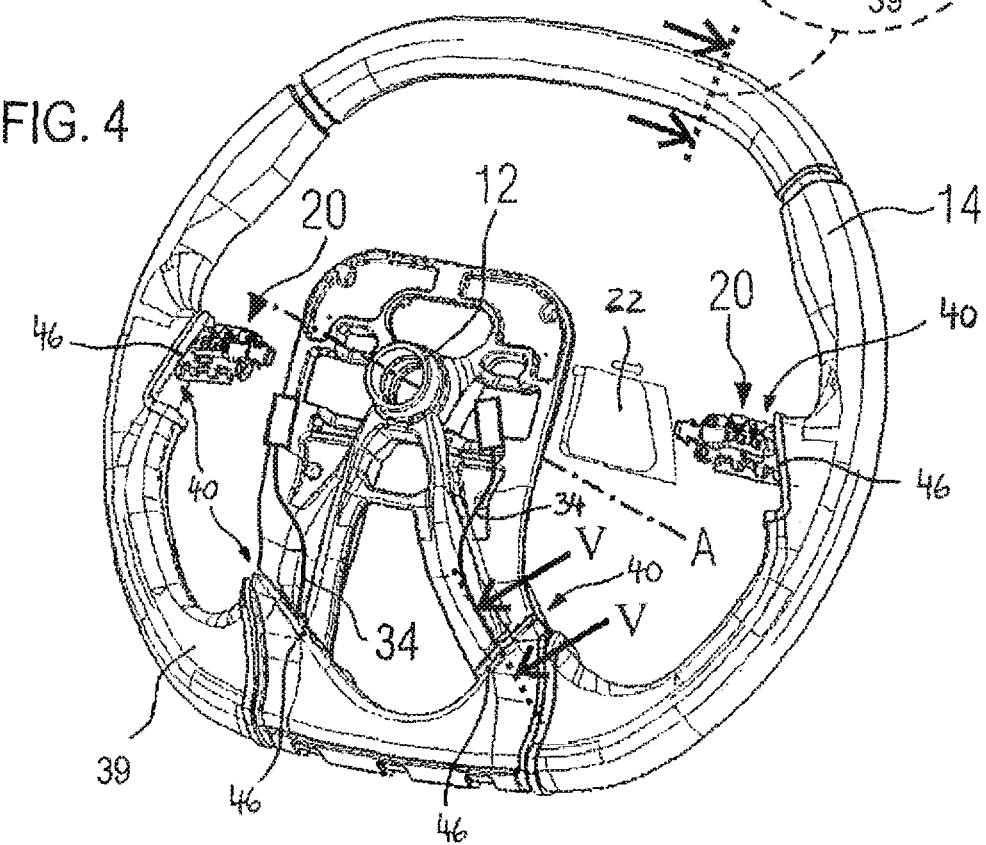
FIG. 4 shows the rear view of the steering wheel according to FIG. 2 with the foam wrapping being applied.

Analogously to FIG. 2, FIG. 4 illustrates a rear view of the steering wheel 10, the steering wheel skeleton 16 and the skeleton cover 18 being partially enclosed by a foam wrapping 39, i.e. a flexible foam material made from plastic, and protruding from the foam wrapping 39 at foamed edges 46. The foam wrapping 39 is adjacent to each of a skeleton projection 36 of the steering wheel skeleton 16 and a cover projection 38 of the skeleton cover 18 in the area of the foamed edges 46. Concretely speaking, in the area of the mounting arm 20 a foamed edge 46 is provided, with the free end 21 of the mounting arm 20 protruding from the foam wrapping 39. Moreover, in the area of the spoke 17 a foamed edge 46 is provided, wherein the spoke 17 protrudes from the foam wrapping 39 on the hub side. Apart from the foam wrapping 39, the steering wheel rim 14 optionally may further include an integrated steering wheel heating as well as a wooden or leather lining.

FIG. 5 illustrates a schematic detailed section V-V of the steering wheel 10 from FIG. 4 when the foam wrapping 39 is applied. In the area of the foam wrapping 39, the steering wheel skeleton 16 and the skeleton cover 18 at least in portion form passage walls of a line passage 19 which is largely foam-free in the interior, wherein the skeleton projection 36 and the cover projection 38 are arranged on an outside of the passage walls, enclose the line passage 19 and extend transversely to a passage axis K of the line passage 19.

According to FIG. 5, a free edge 47 of the skeleton and, resp., cover projections 36, 38 which abuts on the foaming mold 42 and faces away from the steering wheel skeleton 16 and the skeleton cover 18 is designed to be especially sharp-edged so that, when the foaming mold 42 is closed, said edge 47 acts upon an elastic seal 44 of the foaming mold 42, especially even engages in the latter and thus ensures especially reliable sealing. The skeleton projection 36 and the cover projection 38 exemplify a triangular cross-sectional shape in this case. Alternatively, as a matter of course also other cross-sections, especially trapezoidal cross-sections, are imaginable, however.

FIG. 6 illustrates a cutout of a perspective rear view of the steering wheel skeleton 16. Here it is evident that the steering wheel skeleton 16 in the area of the steering wheel rim 14 has a U-shaped cross-section including a flange and two opposite legs 48, the legs 48 being connected by plural reinforcing lands 50 spaced apart from each other. Moreover, also in the area of the skeleton extensions 24 and spokes 17 U-shaped or at least concave skeleton portions 52 are provided.

Without a skeleton cover the foamed edges 46 would be provided, when the steering wheel skeleton 16 is partially foam-wrapped, in the area of the concave skeleton portions 52 (cf. FIG. 4), which would already result in an increased sealing expenditure. Sealing would be especially difficult due to the electric line 34 which equally extends across said area. Then, on the one hand, the foaming mold 42 would have to guarantee reliable sealing and, on the other hand, would have to be prevented from damaging the line 34.

Therefore, it is of particular advantage to dispose the skeleton cover 18 on the side of the steering wheel skeleton 16 opposite to the flange (see FIG. 2), with the skeleton cover 18 being spaced apart from the reinforcing lands 50 so that the line passage 19 for receiving the electric line 34 is formed. The line 34 extends, for example, from the plug connector 32 at the mounting arm 20 via the steering wheel rim 14 and the spoke 17 to the hub 12.

The skeleton cover 18 consequently covers the concave skeleton portions 52 which are difficult to seal. In addition, the circumferential wall projection 40 formed by the steering wheel skeleton 16 and the skeleton cover 18 ensures simple reliable and tight contact with the foaming mold 42, thus on the whole enabling easy foam-wrapping with little effort.

The invention claimed is:

1. A steering wheel for an automotive vehicle, comprising:
    a steering wheel axis,
    a hub for fastening the steering wheel to a steering shaft rotatable about the steering wheel axis, as well as
    a steering wheel rim which includes a steering wheel skeleton and a skeleton cover, is connected to the hub by a spoke and at least in portions surrounds the hub in the circumferential direction,
    wherein the steering wheel skeleton and the skeleton cover are partially enclosed by a foam wrapping and protrude from the foam wrapping at a foamed edge,
    wherein the foam wrapping is adjacent to a skeleton projection of the steering wheel skeleton and to a cover projection of the skeleton cover in the area of the foamed edge,
    wherein the skeleton projection and the cover projection are directly adjacent to each other and together form a substantially circumferentially closed wall projection for contacting a foaming mold,
    wherein the steering wheel skeleton and the skeleton cover in the area of the foam wrapping at least in portions form passage walls of a line passage largely foam-free in the interior, the skeleton projection and the cover projection being arranged on an outside of the passage walls, enclosing the line passage and extending transversely to a passage axis of the line passage.

2. The steering wheel according to claim 1, wherein the wall projection encloses the spoke between the hub and the steering wheel rim.

3. The steering wheel according to claim 1, wherein a foamed edge is provided in the area of the spoke and the spoke protrudes from the foam wrapping on the hub side.

4. The steering wheel according to claim 1, wherein the steering wheel skeleton is made from metal or metal alloy.

5. The steering wheel according to claim 1, wherein the skeleton cover is a plastic cover.

6. A steering wheel for an automotive vehicle, comprising:
    a steering wheel axis,
    a hub for fastening the steering wheel to a steering shaft rotatable about the steering wheel axis, as well as
    a steering wheel rim which includes a steering wheel skeleton and a skeleton cover, is connected to the hub by a spoke and at least in portions surrounds the hub in the circumferential direction,
    wherein the steering wheel skeleton and the skeleton cover are partially enclosed by a foam wrapping and protrude from the foam wrapping at a foamed edge,
    wherein the foam wrapping is adjacent to a skeleton projection of the steering wheel skeleton and to a cover projection of the skeleton cover in the area of the foamed edge,
    wherein the skeleton projection and the cover projection are directly adjacent to each other and together form a substantially circumferentially closed wall projection for contacting a foaming mold,
    wherein a mounting arm for fastening an operating unit is configured at the steering wheel rim, wherein the mounting arm extends from the steering wheel rim toward a free end and the wall projection encloses the mounting arm between the steering wheel rim and the free end.

7. The steering wheel according to claim 6, wherein a foamed edge is provided in the area of the mounting arm and the free end of the mounting arm protrudes from the foam wrapping.

8. The steering wheel according to claim 6, wherein the skeleton cover includes an integrally formed cover extension which at least partially forms the mounting arm, the cover projection being formed integrally with the cover extension.

\* \* \* \* \*